United States Patent
Wehner

(10) Patent No.: US 6,925,959 B2
(45) Date of Patent: Aug. 9, 2005

(54) INDICATING INSTRUMENT

(75) Inventor: Manfred Wehner, Wölfersheim (DE)

(73) Assignee: Siemens Aktiengesellschaft, München (DE)

( * ) Notice: Subject to any disclaimer, the term of this patent is extended or adjusted under 35 U.S.C. 154(b) by 20 days.

(21) Appl. No.: 10/481,705

(22) PCT Filed: May 31, 2002

(86) PCT No.: PCT/DE02/02008

§ 371 (c)(1),
(2), (4) Date: Dec. 22, 2003

(87) PCT Pub. No.: WO03/004298

PCT Pub. Date: Jan. 16, 2003

(65) Prior Publication Data

US 2004/0177687 A1 Sep. 16, 2004

(30) Foreign Application Priority Data

Jun. 29, 2001 (DE) .......................................... 101 31 262

(51) Int. Cl.⁷ .............................................. G01D 11/28
(52) U.S. Cl. ..................... 116/286; 116/62.1; 116/62.3; 116/62.4; 116/290; 116/300
(58) Field of Search ................................. 116/286, 287, 116/288, 290, 291, 292, 296, 298, 300, 301, 62.1, 62.3, 62.4, DIG. 5, DIG. 6; 362/26, 23, 29, 30, 31, 581, 559; 340/438, 441, 449

(56) References Cited

U.S. PATENT DOCUMENTS

| | | | | |
|---|---|---|---|---|
| 550,775 A | * | 12/1895 | Blumenstein et al. | 340/441 |
| 1,547,909 A | * | 7/1925 | Earle | 340/441 |
| 1,885,629 A | * | 11/1932 | Rich | 116/292 |
| 2,158,925 A | * | 5/1939 | Braswell | 116/62.1 |
| 2,501,033 A | * | 3/1950 | Denison | 116/296 |
| 3,152,437 A | * | 10/1964 | Vasselli | 116/286 |
| 3,890,716 A | * | 6/1975 | Hatch | 116/298 |
| 4,507,959 A | | 4/1985 | Brazener | |
| 4,838,076 A | | 6/1989 | Ferrada | |
| 4,935,850 A | * | 6/1990 | Smith, Jr. | 362/27 |
| 5,171,982 A | | 12/1992 | Kronenberg | |
| 5,214,624 A | | 5/1993 | Siebrasse | |
| 5,259,333 A | * | 11/1993 | Iino et al. | 116/286 |
| 5,554,970 A | * | 9/1996 | Mottahedeh | 340/441 |
| 5,894,457 A | | 4/1999 | Luth | |
| 6,140,917 A | * | 10/2000 | Branson | 340/441 |
| 6,382,127 B2 | | 5/2002 | Wehner | |
| 6,778,074 B1 | * | 8/2004 | Cuozzo | 340/441 |
| 2004/0104816 A1 | * | 6/2004 | Wilson | 340/438 |

FOREIGN PATENT DOCUMENTS

| | | |
|---|---|---|
| DE | 1 448 815 | 1/1969 |
| DE | 1 573 833 | 4/1971 |
| DE | 24 11 799 | 12/1974 |
| DE | 24 01 502 | 5/1975 |

(Continued)

Primary Examiner—Christopher W. Fulton
Assistant Examiner—Travis Reis
(74) Attorney, Agent, or Firm—Cohen, Pontani, Lieberman & Pavane

(57) ABSTRACT

The invention relates to an indicating instrument, particularly for a motor vehicle, comprising an approximately circular scale (12), which is placed on a dial (5), provided for a physical quantity, and along which a pointer (10) can be displaced whereby being able to be rotatably driven about an axis of rotation. Additionally provided is a marking that indicates a particular area of the scale (12). The marking is placed on a part (27), which is situated underneath the plane of the dial (5) whereby enabling it to be rotatably driven about the axis or rotation of the pointer (10) into a control position. The dial (5) comprises, along the movement path of the marking, a window (13) through which the marking can be viewed from the front of the indicating instrument.

20 Claims, 3 Drawing Sheets

FOREIGN PATENT DOCUMENTS

| | | |
|---|---|---|
| DE | 29 42 443 | 4/1981 |
| DE | 30 41 861 | 5/1982 |
| DE | 37 18 439 C2 | 11/1989 |
| DE | 39 06 721 | 9/1990 |
| DE | 39 40 326 | 6/1991 |
| DE | 32 40 525 | 8/1991 |
| DE | 40 26 915 | 2/1992 |
| DE | 43 25 721 | 2/1995 |
| DE | 44 44 702 | 6/1996 |
| DE | 195 00 668 | 7/1996 |
| DE | 195 20 701 | 9/1996 |
| DE | 195 33 829 | 9/1996 |
| DE | 196 01 270 | 7/1997 |
| DE | 198 01 298 | 7/1998 |
| DE | 198 07 483 | 9/1998 |
| DE | 197 37 679 | 3/1999 |
| DE | 197 57 564 | 7/1999 |
| DE | 199 09 163 | 9/2000 |
| EP | 0 483 811 | 5/1992 |
| EP | 0 785 416 | 7/1997 |
| EP | 0 900 686 | 3/1999 |

* cited by examiner

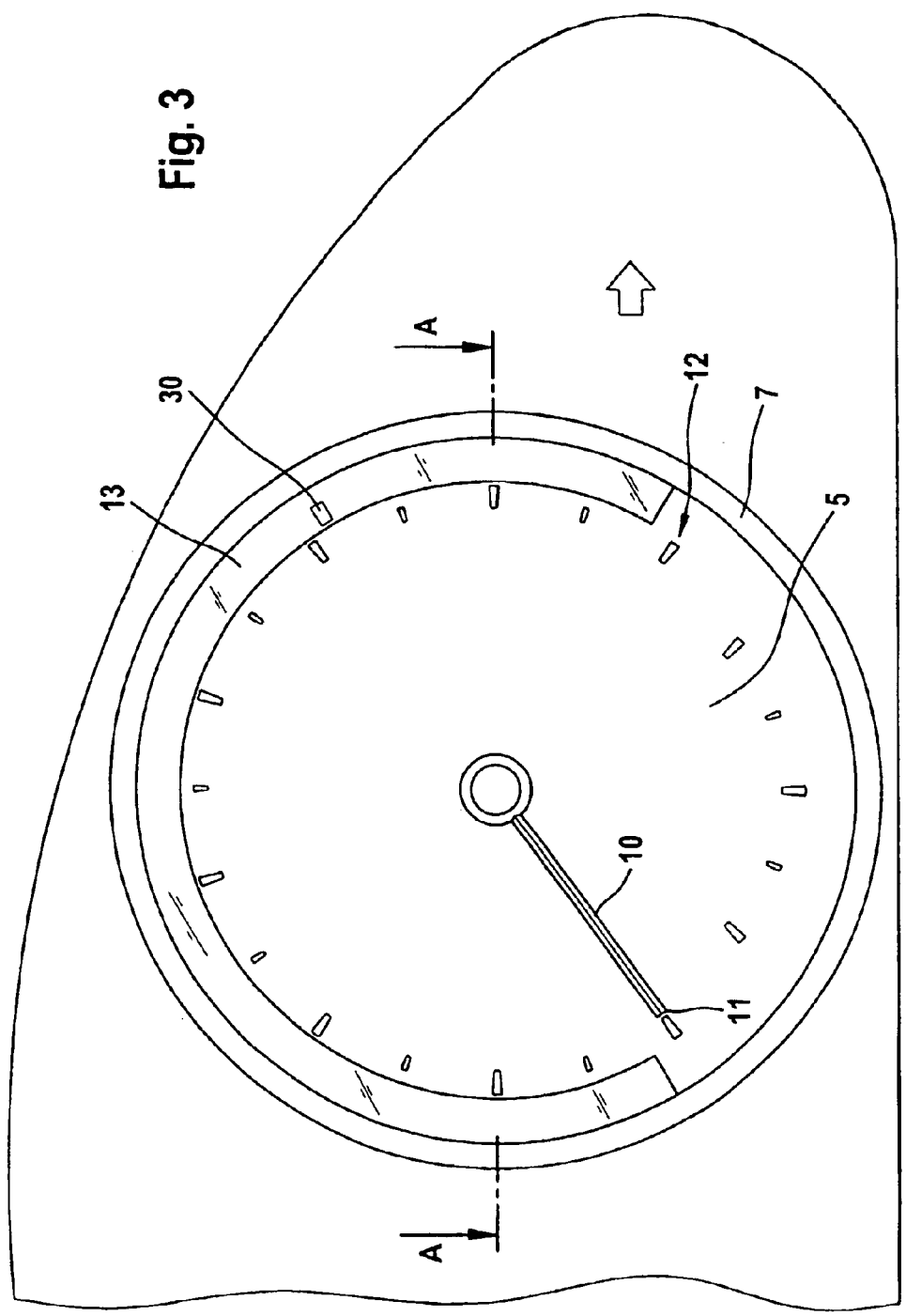

INDICATING INSTRUMENT

PRIORITY CLAIM

This is a U.S. national stage of application No. PCT/DE02/02008, filed on May 31, 2002. Priority is claimed on that application and on the following application(s): Country: Germany, Application No.: 101 31 262.8, Filed: Jun. 29, 2001.

BACKGROUND OF THE INVENTION

1. Field of the Invention

The invention relates to an indicating instrument, particularly for a motor vehicle, comprising an approximately circular scale, arranged on a dial, for a physical quantity, along which a pointer that can be driven rotatably about an axis of rotation can be moved, and comprising a marking indicating a particular area of the scale, the marking being arranged on a component that is arranged below the plane of the dial such that it can be driven rotatably by a marking drive about the axis of rotation of the pointer into a control position, and in that the dial has along the movement path of the marking a window through which the marking is visible from the front side of the indicating instrument.

2. Description of the Related Art

In the case of such indicating instruments, it is known to arrange along the scale a row having luminous elements for which the luminous element or elements respectively controlled forms/form the marking. In the event of a defect or failure of a luminous element, it is a complicated matter to exchange the luminous means of this luminous element. Furthermore, accurate marking is not possible, since the luminous elements have a specific minimum length, and thus an indication is possible only digitally in a fixed module width of the row of the luminous elements.

DE 197 37 679 A discloses an indicating instrument of the type mentioned at the beginning in the case of which the marking is an optical device by means of which light of a light source arranged behind the component carrying the marking is directed through the window.

In a further indicating instrument of the type mentioned at the beginning (EP-A-0 785 416), the component carrying the marking is an optical conductor into one end of which light of a light source is launched, and at whose other end the light is coupled out below the window.

EP-A-0 900 686 discloses an indicating instrument whose dial is enclosed in the same plane by an annular component that carries a marking of luminous design and can be driven rotatably by a marking drive. In this case, the annular component is partially covered by a fixed cover plate.

DE 198 01 298 A discloses an indicating instrument with a dial behind which there is arranged an optical conductor into which light can be launched from a light source and through which the dial can be transilluminated from the rear side.

SUMMARY OF THE INVENTION

It is an object of the invention to provide an indicating instrument of the type mentioned at the beginning that is constructed simply and in a fashion not susceptible to defects, and that permits the marking to be indicated in an at least largely analog fashion.

This object is achieved according to the invention by virtue of the fact that arranged between the dial and component carrying the marking is an optical conductor into which light can be launched by a light source and through which the light can be coupled out so that it can be applied to the component carrying the marking.

This design leads to a simple illumination of the dial. Since furthermore no permanently arranged elements are present, but a marking arranged on a component that can be driven rotatably, the marking can be brought analogously exactly into any desired control position along its movement path. The mechanical construction with simple components reduces the susceptibility of the indicating instrument to defects. Owing to the arrangement of the component carrying the marking below the plane of the dial, no parts project over this plane.

Likewise, for the purpose of illuminating the dial simply, it is possible to arrange between dial and component carrying the marking an optical conductor into which light can be launched by a light source, and by which light can be coupled out onto the rear side of the dial in a fashion illuminating the transilluminable scale and/or transilluminable numerals.

In order to configure the illumination, both of the dial and of the marking in a particularly simple way, it is possible to arrange that a single optical conductor can apply light to the transilluminable scale and/or to the transilluminable numerals, as well as to the component carrying the marking.

If that surface of the component carrying the marking to which light can be applied is designed as a light reflector, the illumination of the window in the dial is further amplified.

In order to reduce and simplify the components of the indicating instrument, the optical conductor can have a cylindrical lug that projects on the side of the optical conductor averted from the dial, is coaxial with the axis of rotation of the pointer, and forms a slide bearing for the toothed ring carrying the component carrying the marking.

The window can extend radially inside or radially outside the scale, or together with the scale in a fashion covering it.

Furthermore, the window can be a cutout in the dial.

If the window is formed by a transparent or translucent region of the dial, that region of the indicating instrument situated behind the dial is protected against soiling.

The marking can mark a specific value of the scale in a punctiform fashion. By punctiform it is to be understood that only a single indicated value is indicated by the marking. A marking can in this case be, for example, a point, a line marking or an arrow directed radially relative to the scale.

In a preferred design, the scale can be a driving speed scale, and the punctiform marking can be a setting marking of the set driving speed forming the control position of a traveling speed controller or a traveling speed limiter.

A further possibility consists in that the marking extends along a specific area of the scale, it being possible to design the marking like a scale or like a bar.

In this case, the scale-type or bar-like marking can be a warning area that can be set variably as a function of a further quantity.

This is the case, for example, when the scale is an engine speed scale and the warning area is an engine speed warning range for an internal combustion engine.

The component can in this case be driven rotatably into the control position as a function of the respective operating temperature of the internal combustion engine. It is thereby possible that at a low operating temperature, for example after the start of operation, the warning range indicating the maximum permissible speed is located in a low engine speed range of the scale, and moves into a higher engine speed range of the scale in accordance with the rise in operating temperature.

The component can be an arm that extends radially from the axis of rotation and carries the marking.

In order to obtain a uniform background in the window, the component is preferably a disk that is arranged centrally relative to the axis of rotation and carries the marking.

A simple design of the drive of the marking is achieved by virtue of the fact that the component carrying the marking is arranged at a toothed wheel or toothed ring that is supported rotatably in a central fashion relative to the axis of rotation and can be driven rotatably by a drive pinion of the marking drive.

If the marking drive is a stepping motor, not only is it possible to achieve a control position that can be exactly specified, but energization is necessary only to change the position of the marking, but not to retain the position of the marking, and this leads to a saving in energy.

BRIEF DESCRIPTION OF THE DRAWINGS

In the drawings,

FIG. 3 is a plan view of the indicating in FIG. 1 according to a second embodiment.

DETAILED DESCRIPTION OF THE PRESENTLY PREFERRED EMBODIMENTS

Figure 1:
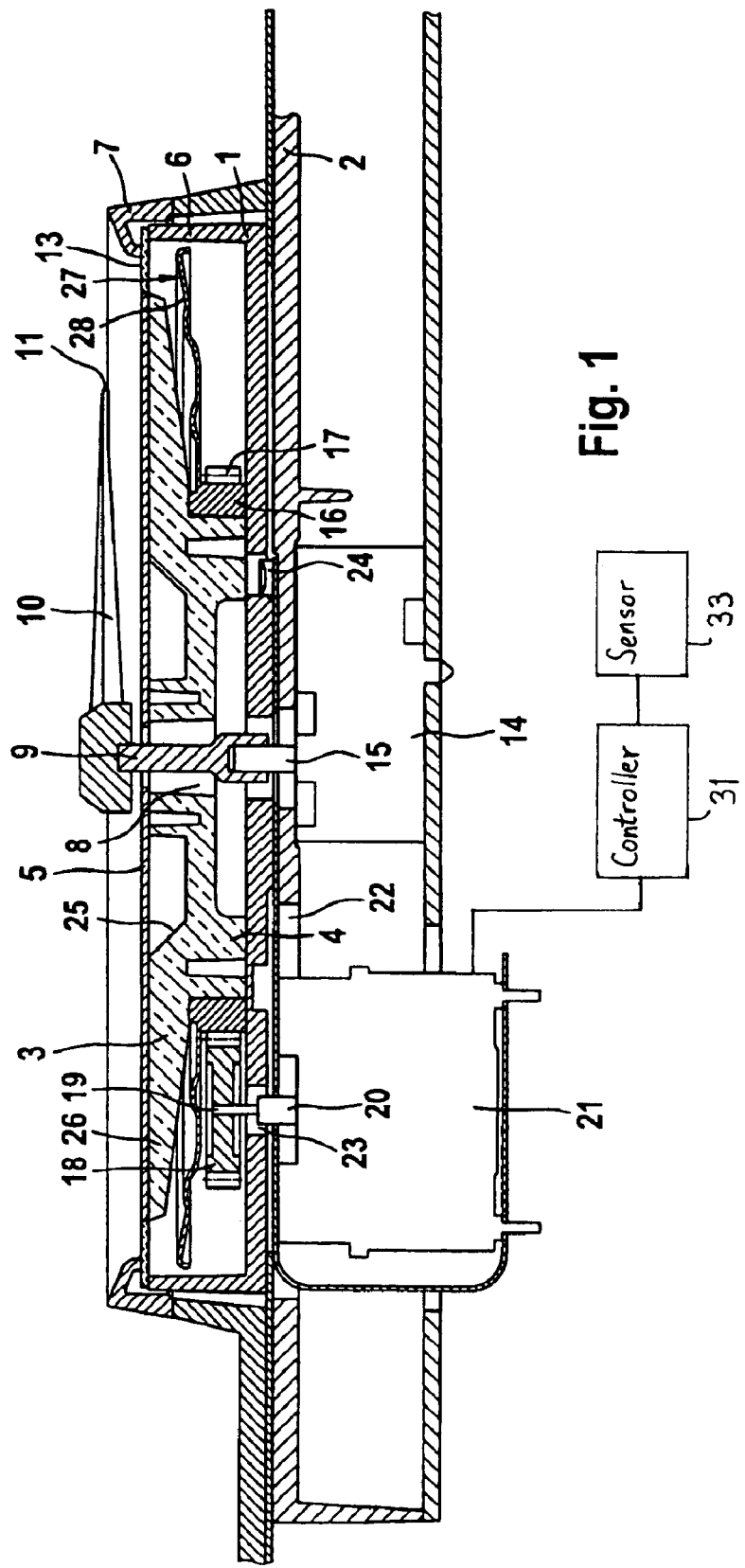
FIG. 1 is a side view of an indicating instrument in section according to the present invention.

The indicating instrument illustrated in FIG. 1 has an approximately pot-shaped carrier 1 that is fastened on a base plate 2. Arranged inside the pot of the carrier 1 is an optical conductor 3 that is in the shape of a circular disk and rests with the aid of an integral cylindrical lug 4 on the base of the carrier 1.

Situated on the side of the optical conductor 3 facing away from the base of the carrier 1 is a dial 5 that projects radially with its edge region beyond the optical conductor 3 and rests on the end face of the circumferential pot wall 6 of the carrier 1.

The dial 5, optical conductor 3, carrier 1 and base plate 2 centrally have a continuous cutout 8 through which a pointer shaft 9 penetrates. On the end of the side of the dial, the pointer shaft 9 supports a radially directed pointer 10 that, upon rotation of the pointer shaft 9, sweeps with its pointer tip 11 over a scale 12 (see FIG. 2) that is arranged in the shape of a circle and whose scale marks can be transilluminated.

Approximately three-quarters of the circular scale is enclosed by a transparent region of the dial 5 that forms an arcuate window 13. In this arrangement, the optical conductor 3 reaches radially up to the inner boundary of the arcuate window 13, while the radially outer boundary of the window 13 is formed by the inner circumference of the clamping ring 7.

Serving the purpose of rotary drive for the pointer 10 is a pointer drive 14 that is fastened on the side of the base plate 2 facing away from the carrier 1 and whose drive journal 15 is connected to the pointer shaft 9 coaxially in a rotationally secure fashion.

The cylindrical lug 4 forms a slide bearing on which a toothed ring 16 is rotatably mounted, an inner circumference of the toothed ring 16 encircling the cylindrical lug 4. The toothed ring engages with its radially directed teeth 17 in the teeth of a drive pinion 18 whose axis of rotation extends parallel to the axis of rotation of the pointer shaft 9.

The drive shaft 19 of the drive pinion 18 projects through a cutout 23 into the base of the carrier 1 and is connected coaxially in a rotationally secure fashion to the drive journal 20 of a marking drive 21 that is arranged, projecting through a cutout 22 in the base plate 2, on the side of the base of the carrier 1 facing away from the optical conductor 3. Arranged on the toothed ring 16 is an annular disk 27 that projects radially outward to a position below the window 13, and whose surface facing the optical conductor 3 and the window 13 is designed as a light reflector 28. The marking drive 21 is controlled by a controller 31 in response to a sensor 33.

Arranged in the base of the carrier 1 is, furthermore, a light source 24 by means of which there is launched axially into the optical conductor 3 in the region of the lug 4 light that is deflected at a deflecting surface 25 into the radially directed region 26 of the optical conductor 3 and is distributed there over the entire circulating radially directed region 26.

The scale marks of the scale 12 on the dial 5 bordering one side of the optical conductor are transilluminated by light coupled out of the optical conductor 3.

The disk 27 carries a marking (described further below). The light coupled out on the surface of the optical conductor 3 opposite the dial 5 strikes the disk 27 carrying the marking as reflected light, and thus illuminates this marking. Since the disk 27 is designed as a light reflector 28, the arcuate window 13 is furthermore illuminated. The design of the indicating instrument illustrated in FIG. 1 is the same for both the exemplary embodiments illustrated in FIGS. 2 and 3.

Figure 2:
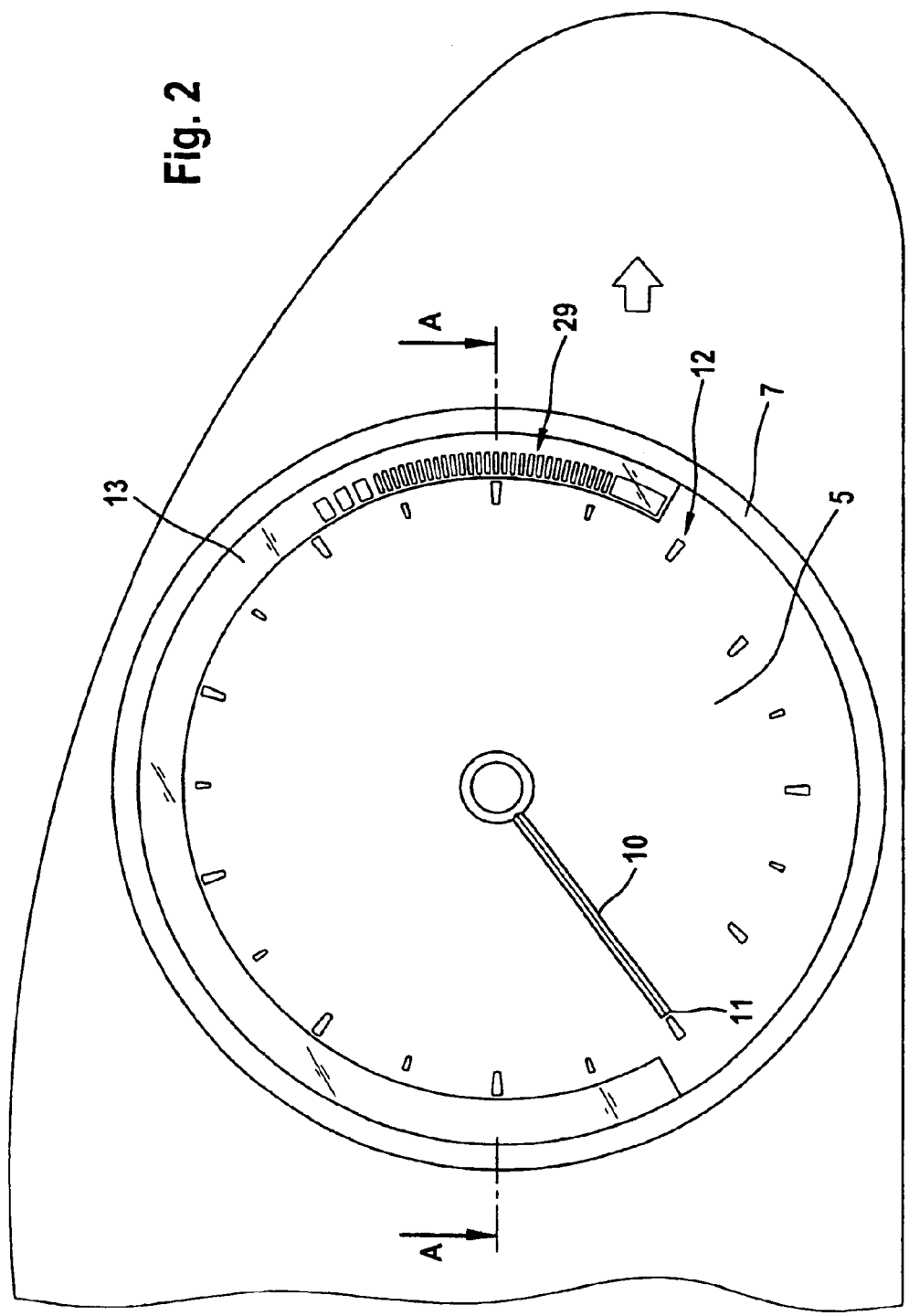
FIG. 2 is a plan view of the indicating instrument in FIG. 1 according to a first embodiment.

In FIG. 2, the marking applied to the disk 27 in the region of the window 13 is an engine speed warning range 29 that is not to be exceeded so as to avoid damage to the internal combustion engine. Since the maximum permissible engine speed is a function of the respective engine temperature, the sensor 33 is a temperature sensor in this embodiment and the marking drive 21 is correspondingly controlled. The drive pinion 18 and the toothed ring 16 are actuated by the marking drive 21 to rotate the disk 27 into a control position in which the maximum mark of the scale-type marking 29 is opposite the position of the engine speed scale that corresponds to the maximum permissible engine speed corresponding to the instantaneous engine temperature. With rising engine temperature, the maximum permissible engine speed also rises, such that the position of the scale-type marking 29 is varied correspondingly.

In FIG. 3, the scale 12 is a traveling speed scale on which the pointer 10 indicates the respective traveling speed of a motor vehicle. In this embodiment, the marking applied to the disk 27 in the region of the window 13 is a line marking 30 that serves as setting marking of a traveling speed controller. Here, the sensor 33 senses a traveling speed desired by a driver. The marking drive 21 is controlled in accordance with the traveling speed that is desired by a driver of a motor vehicle and is to be controlled by a traveling speed controller. The marking drive uses the drive pinion 18 and the toothed ring 16 to drive the disk 27 into a control position in which the line marking 30 is opposite the position of the driving speed scale that corresponds to the traveling speed set.

What is claimed is:

1. An indicating instrument, comprising:
   a dial defining a plane and having a front side and a rear side;
   an approximately circular scale arranged on said front side of said dial;

a pointer rotatably drivable about an axis of rotation relative to said dial;

a marking indicating an area of said scale and arranged on a component rearward of said plane of said dial, said component being rotatable mounted for rotation about the axis of rotation of said pointer;

a marking drive connected to said component for rotatably driving said component to a control position, said dial defining a window through which said marking is visible from the front side of said dial;

an optical conductor arranged between said dial and said component carrying said marking; and a light source for emitting light into said optical conductor, wherein said optical conductor is arranged so that at least a portion of said emitted light is coupleable out of said optical conductor and incident on said component carrying said marking.

2. The indicating instrument of claim 1, wherein said scale includes at least one of transilluminable numbers and indications, said optical conductor being further arranged such that the emitted light is coupleable out of said optical conductor and onto the rear side of said dial for illuminating said scale.

3. The indicating instrument of claim 2, wherein said optical conductor comprises a single element for applying light to both said scale and said component carrying said marking.

4. The indicating instrument of claim 1, wherein said component carrying the marking comprises a surface on which the emitted light is incident, said surface being a light reflector.

5. The indicating instrument of claim 1, wherein said optical conductor includes a cylindrical lug projecting on a side of said optical conductor facing away from said dial, said lug being coaxial with the axis of rotation of said pointer and forming a slide bearing for said component carrying the marking.

6. The indicating instrument of claim 1, wherein said window extends radially inside of or radially outside of said scale.

7. The indicating instrument of claim 1, wherein a radial extent of said window laps a radial extent of at least a portion of said scale.

8. The indicating instrument of claim 1, wherein said window is a cutout in said dial.

9. The indicating instrument of claim 1, wherein said window is formed by a transparent or translucent region of said dial.

10. The indicating instrument of claim 1, wherein said marking marks a specific point indicating a value of said scale.

11. The indicating instrument of claim 10, wherein said scale is a driving speed scale for a motor vehicle, and said marking is a setting marking of a desired driving speed of a driver of the motor vehicle for forming the control position of a traveling speed controller or a traveling speed limiter.

12. The indicating instrument of claim 1, wherein said marking extends along a specific area of said scale.

13. The indicating instrument of claim 12, wherein said marking is one of a scale portion and a bar extending along said scale.

14. The indicating instrument of claim 13, wherein said marking is a warning area.

15. The indicating instrument of claim 14, wherein said scale is an engine-speed scale and said warning area is an engine speed warning range for an internal combustion engine.

16. The indicating instrument of claim 15, wherein said component is rotatably drivable to the control position as a function of an operating temperature of the internal combustion engine.

17. The indicating instrument of claim 1, wherein said component is an arm extending radially from the axis of rotation.

18. The indicating instrument of claim 1, wherein said component is a disk arranged centrally relative to the axis of rotation.

19. The indicating instrument of claim 1, further comprising a toothed element comprising one of a ring and a wheel rotatable about the axis of rotation of said pointer, wherein said component carrying said marking is operatively connected with said toothed element, and a marking drive connected to said toothed element for rotatably driving said toothed element.

20. The indicating instrument of claim 1, wherein said marking drive is a stepping motor.

* * * * *